United States Patent
Franz

(10) Patent No.: US 7,814,832 B2
(45) Date of Patent: Oct. 19, 2010

(54) METHOD OF PREPARING FABRIC FOR SEWING, OR FOR CUTTING AND SEWING

(76) Inventor: Linda Elizabeth Franz, 2040 Watson Dr., Burlington, Ontario (CA) L7R 3X4

( * ) Notice: Subject to any disclaimer, the term of this patent is extended or adjusted under 35 U.S.C. 154(b) by 723 days.

(21) Appl. No.: 11/709,450

(22) Filed: Feb. 22, 2007

(65) Prior Publication Data

US 2007/0199466 A1    Aug. 30, 2007

Related U.S. Application Data

(60) Provisional application No. 60/776,980, filed on Feb. 27, 2006.

(51) Int. Cl.
*B41F 33/00* (2006.01)
(52) U.S. Cl. .......... 101/483; 101/35
(58) Field of Classification Search .......... 101/35, 101/483; 700/130–135, 167, 171
See application file for complete search history.

(56) References Cited

U.S. PATENT DOCUMENTS

| | | | |
|---|---|---|---|
| 2,756,434 A * | 7/1956 | Campins et al. | 2/243.1 |
| 4,916,634 A * | 4/1990 | Collins et al. | 706/62 |
| 5,791,215 A * | 8/1998 | Morrison et al. | 83/13 |
| 6,173,211 B1 * | 1/2001 | Williams et al. | 700/131 |
| 6,301,518 B1 | 10/2001 | Kawaguchi | |
| 2005/0090928 A1 | 4/2005 | Gibson | |
| 2005/0193574 A1 * | 9/2005 | Tedesco et al. | 33/2 R |

OTHER PUBLICATIONS

Franz, The Inklingo Handbook, 2009, 128 pages, ISBN 978-0-9810994-5-3, published by Linda Franz, Burlington ON Canada.
Franz, Inklingo Shape Collection # 3, 2007, 1128 pages, ISBN 978-0-9730304-6-4, published by Linda Franz, Burlington ON Canada.
Franz, Lucy Boston Patchwork of the Crosses, 2009, 32 pages, ISBN 978-0-9810994-8-4, published by Linda Franz, Burlington ON Canada.
Franz, Jane Austen Patchwork Mystery, 2009, 48 pages, ISBN 978-0-9810994-6-0, published by Linda Franz, Burlington ON Canada.
Franz, Double Wedding Ring 12 inch, 2009, 109 of 464 pages, ISBN 978-0-9810994-7-7, published by Linda Franz, Burlington ON Canada.
Franz, Inklingo Lite # 4, 2009, 101 of 563 pages, ISBN 978-0-9810994-9-1, published by Linda Franz, Burlington ON Canada.
Quiltmaker Editor, Piecing Perfection, Quiltmaker magazine, Jan./Feb. 2007, 1 page, published by Creative Crafts Group, Colorado.

(Continued)

*Primary Examiner*—Ren Yan

(57) ABSTRACT

A system and method of marking at least one guideline (76) on sheets of fabric (58) using a digital template (52A) composed of lines and marks that outline shapes required in a fabric item or quilt, with a personal computer (54) and a printer (56). The ink is deposited on the fabric in ultra-fine color lines that are visible to guide the cutting and stitching of fabric but are not visible when the fabric item is completed. It saves time, improves accuracy, and simplifies the preparation steps for home sewing, quilting, embroidery and other stitching.

6 Claims, 8 Drawing Sheets

OTHER PUBLICATIONS

Marvig, Inklingo Trial-A-Product, Australian Patchwork & Quilting magazine, Jan. 2007, 2 pages, vol. 15, No. 2, published in Australia.

Thomas, The Lowdown, Popular Patchwork magazine, Oct. 2006, 1 page, published in England.

Quiltmania Editor, What's New, Quiltmania magazine, Dec. 2007, 1 page, published in France.

Quilter's Newsletter Editor, Shop Talk, Quilter's Newsletter Jan./Feb. 2007, 1 page, published by Creative Crafts Group, Colorado, USA.

Franz, Advertisement for Inklingo, 2009, 1 page (double sided), published by Linda Franz, Burlington ON Canada.

Franz, Catalogue for 4 Inklingo Books, 2009, 1 page (double sided), published by Linda Franz, Burlington ON Canada.

* cited by examiner

| | | | | |
|---|---|---|---|---|
| 00 | 01 | 02 | 04 | 05 |
| 11 | 16 | 18 | 20 | 21 |
| 22 | 26 | 28 | 31 | 35 |
| 36 | 38 | 41 | 46 | 50 |

PRINTED WITH BLACK INK FOR THIS APPLICATION ONLY.
THE ULTILITY OF THIS COMPONENT REQUIRES IT TO BE
PRINTED IN SPECIFIC COLORS, EACH IDENTIFIED BY NUMBER,
AS DESCRIBED IN THE TABLE IN THE SPECIFICATION.

FIG 2

METHOD OF PREPARING FABRIC FOR SEWING, OR FOR CUTTING AND SEWING

CROSS-REFERENCE TO RELATED APPLICATIONS

This application claims the benefit of provisional patent application Ser. No. 60/776,980, filed Feb. 27, 2006 by the present inventor.

FEDERAL SPONSORED RESEARCH

Not Applicable

SEQUENCE LISTING OR PROGRAM

Not Applicable

A portion of the disclosure of the patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

This invention relates to printing guidelines on fabric, specifically an improved method Of preparing fabric pieces for quilts and other fabric items.

2. Prior Art

A Few Common Terms: Patches, Right Side, Wrong Side, etc.

Pieces of fabric are sometimes called "patches" and can be joined side by side with seams by hand or machine sewing, called "piecing" or "sewing a seam." For quilts, patches may be all the same, or different shapes that fit together, to form "blocks" which fit together to form a "quilt top."

When a patch is sewn on top of a background fabric, rather than side by side, it is called appliqué.

Sewing a fabric project requires fabric pieces of a certain size and shape, with an added margin for the seam, called a "seam allowance."

Fabric is usually described as having a "right" and "wrong" side. The right side is the decorative or patterned side that is intended to show in the finished item (front). The other side is the wrong side (back). Fabric patches are layered "right sides together" to sew a seam. Therefore, if stitching guides are drawn on the fabric, they are drawn on the wrong side, to be visible to the person who is sewing.

Fabric pieces must be cut along the "straight grain" of the fabric so appropriate edges are parallel to the threads in woven fabric. Appropriate straight grain ensures that the edges will not stretch and distort, which makes stitching more difficult, and also reduces the quality and appearance of the finished item.

Nowadays some patches are fused with various fabric adhesives instead of thread, to create the appearance of sewing, and that meaning is included in the references to sewing in this application.

Measurements in quilting are by convention described in inches rather than metric units. Measurements in home sewing also often use inches. Measurements in this application are therefore provided in metric units and in inches.

Historical Methods of Cutting and Marking Fabric

Historically, sewers, embroiderers and quilters used a pattern or template to determine how to cut the fabric for their sewing projects and quilt designs, and to mark stitching guides. Quilters and sewers used paper or cardboard as template material. They measured and drew the shapes on the template material, then traced around the templates to make lines on the fabric with a pencil, to guide the cutting and stitching, or pinned the templates to the fabric and cut around the edges of the template.

The templates were individually aligned by the user along the straight grain of the fabric so appropriate edges would be parallel to the threads in woven fabric.

Quilters added a seam allowance to each edge (often 6.35 mm or ¼ inch) and cut the fabric patches one at a time, with scissors. Home sewers add various widths of seam allowances, often 1.5 cm or ⅝ inch (1.6 cm), depending on several factors.

Quilters and sewers cut out the pieces of fabric with scissors until about 1980, when home sewing and quilting were revolutionized by the introduction of the rotary cutter. The rotary cutter replaces scissors. A rotary cutter is similar to a pizza cutter. It is used with a self-healing plastic mat and a straight edge, which is typically an acrylic ruler. The blades in rotary cutters must be replaced frequently.

Prior art methods using Specialty Rulers, Templates (Hand Piecing and Applique), Foundation Piecing, and Printing on Fabric are each described below.

Prior Art Specialty Rulers

Slicing through multiple layers of fabric with a rotary cutter and a specialty ruler is faster than cutting with scissors, however this method creates other issues.

In particular, users must cut and sew patches without any lines marked on the fabric. That is accepted for machine stitching, since a seam guide on the sewing machine is used to determine the width of the seam allowance, making it unnecessary to mark stitching lines. Consumers could cut fabric without marking a cutting line either, by using a rotary cutter and an ever-increasing variety of specialty rulers, which saved time.

Cutting many layers of fabric at a time with a rotary cutter and a ruler is fast, but there are several disadvantages, including difficulty in measuring; the number and complexity of rulers; expense; and safety issues. Potential consumers are discouraged from learning how to sew or quilt because it looks too expensive and complicated.

Accurate measuring and cutting with specialty rulers is difficult. The user must measure, add seam allowances and take straight grain of the fabric into account, without any lines on the fabric to guide the position of the ruler. This results in mistakes that waste fabric and time. It can discourage or prevent the user from sewing fabric or making quilts.

It is difficult to measure and cut small increments (eighths or sixteenths of an inch) accurately with a thick acrylic ruler. This can inhibit the user from making desirable items or using small patches, placing limits on creativity and artistic choice.

It is difficult to measure and cut at any angle other than ninety degrees to the fabric edge. This difficulty can effectively eliminate some fabric items that would otherwise be desirable, placing limits on creativity and artistic choice.

Aligning a ruler on the correct straight grain is confusing. It is important to be correct, but choosing the edge to be on straight grain is not obvious, especially to beginners. For example, straight grain of the fabric on right-angle triangle patches should sometimes be on the longest edge and sometimes on the two shorter sides, depending on whether the triangle will be used on an edge or in the center of a quilt top or other fabric item. An error makes it more difficult to stitch without distortion and reduces the quality and durability of the fabric item.

The use of rotary cutters has led to the development of hundreds of rulers with special markings to allow users to measure and cut different shapes without templates.

Some rulers are engineered to provide many sizes or shapes, and they frequently include elaborate instructions. There are so many specialty rulers with different markings that correct use is not obvious. The markings are not uniform. Some rulers include the seam allowance and some don't. Some are so cluttered with lines that it is easy to make mistakes and waste fabric. Some require a very systematic step-by-step approach to folding, re-folding and cutting the fabric in a certain sequence to achieve the desired results. If the folding or cutting is not perfect, the fabric is wasted. The color of the lines on a particular ruler may not be easily visible on all fabrics.

Some online shopping sites stock more than one hundred different rulers from a single manufacturer, and there are many competing manufacturers. Some authors sell rulers custom-made for one particular pattern. Even with this vast proliferation of rulers, they are not available for every contemplated size and shape of fabric piece or patch.

There are so many different rulers that each local quilt shop or fabric store cannot stock them all. When a desired ruler is not available locally, it can be purchased online, but shipping adds to the expense for the consumer. Acrylic rulers are brittle and can break or chip so they are difficult to package for shipping.

A consumer may need to buy and use so many different rulers that racks and organizers are sold to keep track of them all. Rulers require storage space.

Specialty rulers are so pervasive that many patterns only include instructions for rotary cutting. Those patterns are not compatible with scissors. Beginners, children and disabled users who cannot safely use a rotary cutter are therefore discouraged from making those designs. Consumers may decide not to learn to sew or quilt at all.

Rotary cutters can be used safely, but the requirement to measure and cut simultaneously can be dangerous. The ruler is aligned first to measure, and then the rotary cutter is placed beside the ruler and rolled along the edge. The blade can jump the edge of the ruler and cause injury, or chip the ruler, creating an unsafe edge. It is preferable to have a line on the fabric, so the user can set the blade before sliding the ruler into position, so the cutter is less likely to jump the edge and cause injury. This safer method is not used when there is no cutting line marked on the fabric.

All of these disadvantages of specialty rulers exclude children and handicapped users, and discourage beginners.

Prior Art Templates

With the introduction of rotary cutting, "templates" became a dirty word for some. Templates are considered to be old-fashioned, too time-consuming, and subject to error. Nevertheless, to avoid the disadvantages of specialty rulers, consumers sometimes find it easier to make templates to use with a rotary cutter.

The user may measure and draw shapes to make homemade templates. Otherwise, she may trace from a book or print from software onto template material like thin plastic, heat-resistant plastic, adhesive labels, cardboard, paper, freezer paper (a paper that is coated with plastic on one side, so it sticks to fabric when pressed with a hot iron, thus eliminating the need for pins and improving accuracy, and which can be peeled off neatly without leaving any residue), and others.

Several sources of pre-cut templates made from heat-resistant plastic, adhesive-backed paper, paper or cardboard are available to save the user tracing or cutting her own templates, and providing greater accuracy. One template is required for each patch so they are commonly sold in bags of fifty or more. Templates can be reused, but some quilts and fabric items require several hundred templates, and that can be expensive.

The user attaches the templates to the fabric one at a time, using pins, adhesive or heat, on the appropriate straight grain of the fabric, then cuts out each patch and adds stitching lines.

To avoid the slow process of marking stitching lines, some products require the user to baste fabric onto the template material before stitching, and then to remove the basting and templates after sewing.

Different methods of using templates for hand piecing and appliqué are described below.

(a) Templates for Prior Art HAND PIECING Practices

There are books, such as my own Quilted Diamonds and Quilted Diamonds 2, which teach methods of using freezer paper templates. The shapes are traced onto freezer paper (or printed onto freezer paper from a CD). Each shape is cut out to make an individual freezer paper template for each patch. The freezer paper templates are attached to the wrong side of the fabric with heat by pressing with an iron. Each template must be individually positioned on the appropriate straight grain of the fabric. Freezer paper templates provide the patches in the desired finished size, so the user must add the seam allowance (usually 6.35 mm or ¼ inch) all the way around the shape when cutting the fabric, using a straight edge and rotary cutter, or with scissors. She must also draw a line next to the freezer paper, all the way around the template, to guide the stitching. The freezer paper is commonly removed before stitching the patches together.

This prior art process works well if the templates are accurate and if they are individually positioned correctly on the straight grain of the fabric. However, preparing the templates, cutting the individual patches, marking the stitching lines (and other marks) and positioning the templates takes a significant amount of time and effort, and it must be done accurately. It requires skill that can be difficult for a beginner. Incorrect grain causes the edges of a quilt block or other item to distort, making it difficult to assemble the quilt top or project, and reducing the quality and durability of the finished item.

The user marks the stitching lines on the wrong side of each piece of fabric using a template, a ruler, and a mechanical pencil or similar marker. Thick or inaccurate lines make the stitching more difficult and reduce the quality of the finished project. The marks may just be dots at the seam endings, or may be stitching lines with crosshairs at the end of each seam. The marks are usually permanent, and piecing is done with two right (decorative) sides together so seam lines must be marked on the wrong side of the fabric to be visible to the user while stitching.

Also, a pencil line may not show up well on the wrong side of fabric, depending on its color and design. The user may need to buy special white and colored pencils to mark the lines, and those lines tend to be wider and less accurate than those drawn with a mechanical pencil. Special pencils for marking on dark fabric have soft lead that breaks easily, and they require frequent sharpening. Specialty markers dry out, and are easily mislaid. Finding a color that shows well enough is a complication that makes the preparation and the sewing more difficult and expensive. It may also prevent the user from choosing certain fabrics that would otherwise be desirable.

Drawing the stitching lines on fabric is considered so time-consuming and tedious that some quilters tried using rubber stamps or transfer paper to mark cutting and stitching lines. This was not very successful for several reasons. It is messy. The lines tend to be thick and show on the right side of the fabric. The lines smudge. Stamping is tiring and tedious because the stamp must be lined up with the straight grain of woven fabric every time. Many pads with different colors of ink are required to show on different colors of fabric. Fabric ink or transfer ink is not always available in a color that shows on a particular fabric. Only a limited range of stamps was produced, so not all desirable shapes were available. Stamps and transfer paper are expensive.

Another method of hand piecing, sometimes called English Paper Piecing, allows the user to skip marking the stitching lines. However, not marking the stitching lines creates several additional steps, including basting the individual fabric patches to templates, whip-stitching the edges (as opposed to a faster running stitch), and removing the basting and/or the templates. The templates can be plastic or paper, either purchased or homemade. This method is very time-consuming and the finished project is not as appealing as items made by other methods because some stitches are visible on the right side (front), even if the sewer is highly skilled.

There is another disadvantage of prior art hand piecing methods. It is sometimes desirable to use seam allowances narrower or wider than 6.35 mm (¼ inch) but it is difficult to accurately measure eighths or sixteenths of an inch. Therefore, users are sometimes hampered by inappropriate seam allowances, or must go to the trouble of trimming afterwards.

Also, it is sometimes desirable to have different widths of seam allowances on different sides of a patch, for example, 6.35 mm (¼ inch) everywhere except one side which would ideally have a seam allowance 12.7 mm (½ inch) wide, for various reasons. This is possible using current practices but it is confusing, resulting in errors and wasted time and fabric.

(b) Templates for Prior Art APPLIQUÉ Practices

When a patch is sewn on top of a background fabric, it is called appliqué. There are many techniques for stitching appliqué patches for quilts and other sewing projects, utilizing templates.

Common appliqué techniques are needle-turn, reverse appliqué, back basting, freezer paper underneath, freezer paper on top, and others.

The technique used determines the method for making templates and positioning them on the background fabric. Typically, a light box is used to trace designs from a book (or print from a CD) onto template material. For some appliqué methods, the user traces directly onto the fabric. Depending on the preferred stitching method, the user may trace onto the wrong side or the right (decorative) side of the fabric. Either way, the lines traced onto the fabric should not be visible in the finished appliqué item.

Cutting fabric patches for appliqué with traditional templates is slow and subject to error.

In addition to the disadvantages of templates and marking (described for hand piecing above), positioning the appliqué patches on the background takes time and care, and sometimes requires elaborate overlays. Overlays are drawn on transparent plastic or film and must be accurate. The expense of overlay supplies and the extra steps can discourage the user from making these designs. This issue also applies to embroidery and other decorative stitching.

Positioning appliqué patches on the background is especially difficult to do accurately when the design is meant to be symmetrical or centered. Preparation may require careful pinning and basting on a light box to keep the patches from shifting, which is a slow process. Inaccuracy in these preparation steps will be obvious in a finished project, thereby reducing its appeal and quality, and making it less enjoyable for the user.

For hand piecing and appliqué, the user typically also marks the stitching lines with a pencil or other marker. The lines must be light and accurate, which is difficult for some users and takes time. Errors affect the appearance and quality of the finished fabric item. Heavy lines may cause errors in stitching, or may even show through on the right side (front), thus diminishing the appeal and value of the finished fabric item.

Prior Art Foundation Piecing Practices

For foundation piecing, also called paper piecing, the user prints or traces precise outlines and numbers onto a foundation to indicate the edge of each patch and the correct sewing sequence. The foundation can be paper, lightweight interfacing, water-soluble paper or fabric, fabric, or other specialty paper.

The user stitches along the marked lines through layers of fabric and the foundation, adding patches in a specific sequence. A paper foundation is removed when the quilt block is completed, before attaching it to other quilt blocks to form the whole quilt top or other fabric item. Removing the foundation can be very time-consuming and frustrating, as it often requires the use of tweezers.

With foundation piecing, the user is always working in the mirror image of the finished design, so it is even more difficult than usual to cut patches on the correct straight grain. Mistakes waste fabric or reduce the durability and quality of the finished project.

Foundation piecing uses more fabric than other methods because there are no marks on the fabric to guide the user in cutting patches to cover each area of the foundation. The user is expected to cut fabric pieces too big and then trim. This is extra work and results in unusable scraps.

Stitching along the line on the foundation allows the user to achieve greater precision, but a significant amount of fabric is wasted. There are also extra steps to make the foundation removable, and to remove the foundation. A line to guide the stitching is so desirable that consumers have tolerated the waste and the extra step of removing the foundation.

Prior Art Printing on Fabric Practices

Printing decorative elements on fabric for clothing and quilts is well established. Users have printed photos or other designs onto the right side of fabric for many years using personal computers and inkjet printers.

Fabric must be stabilized to feed through an inkjet printer. There are accepted practices of stabilizing fabric utilizing adhesive sheets or freezer paper, both of which can be reusable.

Manufacturers like Hewlett Packard® promote printing decorations on fabric with inkjet printers, for quilts and other fabric projects, by providing projects on their web site, and by publishing books about printing decorations on fabric.

However, inkjet ink will wash out or fade, ruining a decorative feature, so the consumer must use special liquids or other products to treat the fabric (or buy special fabric that has been pre-treated) to prevent the inkjet printer ink from fading or washing away. Specially treated sheets of stabilized fabric are available in plain, light colors for printing decorations.

To date, the main problem with printing on fabric has been that inkjet ink tends to fade or wash out of fabric. None of the prior art takes advantage of that attribute.

According to prior art, printing on fabric has only been used to create a design element in the finished project, such as photographs of the bride and groom in a wedding quilt, or photos on the front of t-shirts, or other decorative elements, and not to assist in preparing fabric patches for quilts and other fabric items.

Prior art references in U.S. Pat. No. 6,301,518 to Kawaguchi (2001) and Publication Number 20050090928 by Gibson (2005) teach printing designs on the right side of the fabric: one to create a decorative pattern on the right side of quilt patches, and one to create adhesive patches to decorate clothing. They do not teach printing on fabric to assist in the cutting and stitching of fabric pieces. Any margins around the patches are outlined on the right (decorative) side of the fabric only. Since stitching is done with two right sides together, stitching lines must be marked on the wrong side of the fabric to be visible to the user while stitching.

There is design software for quilters, such as the products made by The Electric Quilt® Company and Quilt-Pro Systems, Inc. Existing software prints designs onto paper or template material very well, but is not suitable for printing directly onto fabric for several reasons.

First, the pieces are not arranged in a way that would allow straight grain of the fabric on appropriate edges, or in a way to facilitate rotary cutting. Also, although existing quilt design software allows printing in color, the stitching and cutting lines are printed in black ink, which is the most permanent and least desirable for fabric patches. Even the lightest lines are heavier than are desirable to print guidelines onto light-colored fabric.

Current quilting software does not give the user the ability to rotate the patches or arrange them for rotary cutting, or to print an efficient number of patches on each fabric. It also does not allow the user to print registration or matching marks, so those must be added manually to paper templates, which users might skip or forget to do, which results in frustration. Overall, the printing functions are well designed to print on paper, for use with prior art methods of hand piecing, machine piecing, appliqué and foundation piecing, but not to print on fabric.

Prior Art Summary

There are several ways of preparing fabric patches for sewing projects and quilts. Prior art either requires the user to do careful measuring and draw lines on the fabric manually, or to skip drawing the lines and compensate with other tools, methods, and specialty rulers.

Ideally, beginners and experienced consumers would like to have lines on the fabric to guide cutting and stitching. It would be easier to learn sewing and quilting if there was a fast, accurate way to mark guidelines such as (a) cutting lines, especially if they would enable the user to stack, align and accurately cut several layers of fabric at once, without measuring, and (b) stitching lines and other information to assist in sewing the fabric, without affecting the appearance of the finished fabric item.

OBJECTS AND ADVANTAGES

The primary object of the present invention is to provide a system and method for printing on fabric with digital templates that overcomes the deficiencies of prior art methods, thereby making sewing and quilting more accessible to beginners, children and handicapped individuals.

An additional object of the present invention is to provide a system and method for printing on fabric with digital templates that saves time, improves accuracy, and simplifies the preparation steps.

An even further object of the present invention is to provide a system and method for printing on fabric with digital templates that is more economical, more accessible, more enjoyable, better quality, more flexible, more convenient and potentially safer than prior art. These advantages also make it marketable. Each of these advantages is described below.

(a) Saves Time:

My system and method enables the user to entirely skip several traditional steps, and that saves time. It eliminates the need to trace or print the shape onto a template material; the need to individually position templates with the straight grain; the need to manually mark stitching lines and matching marks on the fabric; the need to measure with a specialty ruler; and related tasks.

My system and method enables the user to prepare potentially hundreds of patches in a very short period of time. This speed does not compromise the quality of the patches, but rather provides more information than is readily available using prior art and ensures greater accuracy.

Utilizing my method, the user can cut many layers of fabric at a time with an ordinary straight edge (no measuring) and a rotary cutter. Thus, the user can cut patches in less time than it takes with prior art methods.

Eliminating traditional steps to prepare fabric patches reduces the chances for error in grain line, measuring, marking and cutting, which also saves time.

My system and method is faster for cutting, and also for pinning and stitching, whether the patches are sewn by hand or by machine.

(b) Improves Accuracy:

My system and method is more accurate than prior art methods wherein lines and marks are drawn by hand.

With my system and method, there is no measuring and therefore there are fewer errors. Complex designs with lines cut at unusual angles are possible, even for beginners.

Every patch is aligned correctly on the straight grain of the fabric without positioning each one individually. Reducing these errors saves time and improves quality.

With my system and method, accuracy in cutting and stitching is improved because the user is not required to do without guidelines or required to add guidelines and other information manually.

(c) Simplifies:

My system and method simplifies the cutting and sewing of fabric patches by providing more information to the consumer on the fabric itself, to assist in the cutting and stitching of the patches and to indicate cutting or sewing sequence, which makes the sewing easier and simpler.

Seam allowances slightly wider or slightly narrower than 6.35 mm (¼ inch) can be provided without requiring the user to measure small increments or work with inappropriate seam allowances.

The simplicity allows quilters and sewers to consider more complicated projects than they may have considered with prior art, or to complete more projects in less time.

My system and method is quickly understandable which makes quilting and sewing simple enough for a beginner or a child. The user is able to cut patches with unusual angles without measuring or understanding geometry. A consumer is able to sew accurately without much experience or skill.

(d) Economical:

My system and method is potentially less expensive than using pre-cut templates, specialty rulers or traditional template material, such as freezer paper, heat resistant plastic, adhesive labels, paper or cardboard. It is economical and that makes it easier for beginners to get started.

My system and method replaces the need for many colors and types of fabric markers used with prior art. My system and method uses very little ink per patch, whereas markers used with prior art are expensive. In addition, even less ink is used when patches are cut from layered sheets of fabric, only one of which has ink applied.

My system and method has the potential to be less expensive for the user by utilizing fabric more efficiently too. In addition, there is less waste of fabric due to mistakes in cutting. There is also less waste of fabric because the patches are not cut too big and trimmed.

The user can save storage space for rulers and physical templates and save the expense of racks required to store and organize an abundance of specialty rulers.

Since my system and method is compatible with the entire universe of existing patterns that use the same shapes and sizes, the consumer can make projects from magazines and books that she owns already, despite the fact that they include extra steps that are required with prior art. He or she does not have to buy everything new.

My system and method is compatible with the user's existing personal computer and inkjet printer, so there is no equipment expense.

(e) Accessible to Beginners and Handicapped Users:

There is a very small learning curve, so my system and method is especially suited to beginners and to children. Using a personal computer to prepare fabric has an added attraction of bringing sewing and quilting up-to-date for young users and allows them to concentrate on the stitching, rather than time-consuming preparation steps.

My system and method is easier to understand than measuring and cutting with a specialty ruler without any lines on the fabric. That is reassuring to beginners and gives them confidence to learn sewing and quilting.

Beginners, children and handicapped quilters can use scissors with my system and method if they do not wish to use a rotary cutter or if they have physical limitations that prevent them from using a rotary cutter safely.

My system and method is precise, simple and fast. Not only does it allow children and beginners to start quilting or sewing more easily, it also allows users to enjoy their craft longer into old age.

(f) Increases Enjoyment:

My system and method allows the user to begin sewing as soon as the pieces or patches are cut out, saving time and increasing the user's enjoyment.

The patches prepared with my system and method are suitable for trading to increase the user's selection of fabric patches. She can be confident that any patches received in a swap will be of consistent quality to the ones she is offering in return, regardless of the skill and experience of the other user.

The simplicity and accuracy of this method has the potential to improve the quality of the sewing without requiring great skill and the quality will increase the enjoyment of the user.

The marks on patches prepared with my system and method are attractive, delicate and precise, especially compared with pencil marks. That adds to the pleasure of using the patches and instills confidence, which also increases the enjoyment.

My system and method may also allow the user to create more complex fabric items than she would consider with prior art methods. This increases both the enjoyment of the process and the value of the finished fabric item.

(g) Improves Quality:

My system and method combines ease of use with precision and quality. It improves the appearance and quality of quilts and other fabric items. It also makes them less susceptible to wear, because all of the pieces and patches are aligned on the correct grain of the fabric.

(h) Flexibility:

The method of my invention is very flexible because it is compatible with any existing books or patterns or magazines with designs that use the same shapes and sizes. A quilter or sewer may reconsider designs that are difficult using prior art.

It is also flexible because it is suited to many uses, some of which include preparing
  patches for piecing,
  patches for appliqué,
  patches for foundation piecing,
  lines to guide placement of appliqué patches,
  lines to be embroidered,
  lines to be quilted,
  lines to be stitched in any decorative way, such as cross-stitch, regardless of whether the sewing is done by hand or machine.

Another aspect of flexibility is that my system and method is compatible with most fabric, regardless of the color, pattern, or fiber content, whether woven or non-woven, for which there may not be a suitable marker using prior art.

This flexibility can increase the number or complexity of fabric items that the consumer would otherwise decide to make.

(i) Convenience:

With my system and method, the user has the convenience of preparing a large selection of patches without the problem of storing templates and specialty rulers, which can be lost or broken. A large library including thousands of shapes can be conveniently stored on a single CD (or DVD or other removable media which is compatible with personal computers) CDs and DVDs are compact and durable so they are easy to store.

(j) Safety:

My system and method has the potential to be safer than prior art. The consumer can focus all of his attention on the rotary cutter, without the distraction of simultaneously trying to measure with a ruler. In addition, scissors can be used to cut along the lines, and this is safer than a rotary cutter for children and beginners.

(k) Marketability:

The advantages of my system and method make it popular in shops and marketable to a large number of quilters, home sewers and crafters.

The patches are so attractive and precise that they are suitable for kits, which may be sold with all of the patches ready to cut; or, with all of the patches cut and ready to sew. This is an advantage to quilt shops and other businesses that sell fabric.

My system and method is attractive to shops because it is compatible with their existing inventory of books and patterns, or with new patterns, which designers and authors may create with my system and method in mind. It has the potential to offer thousands of shapes and sizes and to be less expensive and/or more profitable.

A shop can use my system and method to promote making fabric items and quilts that their customers would otherwise find too difficult. If their customers are able to complete more quilts and fabric items using my system and method, it has a positive impact on sales of fabric, books and other merchandise.

It is attractive to shops because a customer cannot copy the components of my system and method to share with friends, which deprives the shop of additional sales.

My system and method is attractive to shops because the product is durable, compact and lightweight in inventory, easy to display, and inexpensive to package and mail, especially when compared to specialty rulers.

My system and method is attractive to shops because it removes barriers for beginners. Beginners can take a class without first being required to buy a rotary cutter, ruler and mat. With prior art, potential customers may be discouraged from taking a shop's beginner class if they must invest in expensive tools without knowing that they will enjoy the craft enough to continue.

My system and method is attractive to shops because it appeals to children, for whom using a computer is especially appealing, and makes quilting and sewing seem more up-to-date. Including children and handicapped individuals increases a shop's customer base.

My system and method is attractive to shops because sewers with experience in prior art methods understand it easily. It is compatible with existing habits or patterns of use despite its novelty. The majority are already using a personal computer and printer for some aspect of their sewing and quilting. This quotation from Quilts Inc about a recent survey of quilters is especially relevant:

"I thought that one of the most interesting things we learned with this survey is how technologically-savvy quilters have become," Bresenhan adds. "From downloading free patterns and ordering supplies to seeing galleries of other's works and writing their own thoughts in blogs and chat rooms, the 2006 quilter is definitely cyber-sensitive."

The many advantages of my system and method could have a significant impact on the total number of quilters. In the United States quilting as a hobby is estimated to be a 3.3 billion dollar a year industry. (http://www.quilts.com/home/news/Survey by Quilts Inc.) That does not include the home sewing and needlework markets, to which my system and method also applies.

SUMMARY

The present invention facilitates cutting and stitching quilts and other fabric items in such a way that the ink is not evident in the finished item, by using a digital template suitable for use with computer software and peripherals and a printing device, such as an inkjet printer or similar mechanism.

The present invention fulfills the above and other objects by providing a method and system for printing on fabric by providing storage with a digital template having at least one guideline of a predetermined color, weight and composition, displaying the digital template on a computer, inserting at least one sheet of fabric into a printer and printing the digital template onto the sheet of fabric whereby at least one guideline is visible on the sheet of fabric.

The storage may be a CD, DVD, a hard disk, a floppy disk or the like, and the fabric may be clothing, a quilt, needlework and the like and may be of any material, such as a substantially natural material, a synthetic material, a woven or nonwoven material or having adhesive properties.

The digital template may also be modified by the user or accessible via the World Wide Web. In addition, a digital template may be created by scanning an object on a scanner and transferring the digital image of the object to a computer, or by copying an object and transferring the digital image of the object to a computer. The ink used may be temporary or permanent.

The system of the present invention includes a means for providing a digital template having at least one guideline on a computer and a means for printing the digital template on a sheet of fabric.

Further objects and advantages of the system and method for printing on fabric with digital templates will become apparent from a consideration of the drawings and ensuing description.

DRAWINGS—FIGURES

FIG. 1 is a configuration of the components of the preferred embodiment.

FIG. 2 shows an example of a test page printed from a digital template, with various combinations of ink and line weights, to be printed on fabric. For the purpose of this application only, it is printed in black ink. The actual test page is always printed on fabric in colors, which are itemized in the table in the specification.

Please note: FIGS. 3 to 7 are printed in black ink for the purpose of this application only.

FIG. 3 shows examples of guidelines to be printed on fabric.

Examples in FIGS. 4 to 7 are provided to the user in several digital templates that are identical except for the color and weight of the lines.

Figure 1:
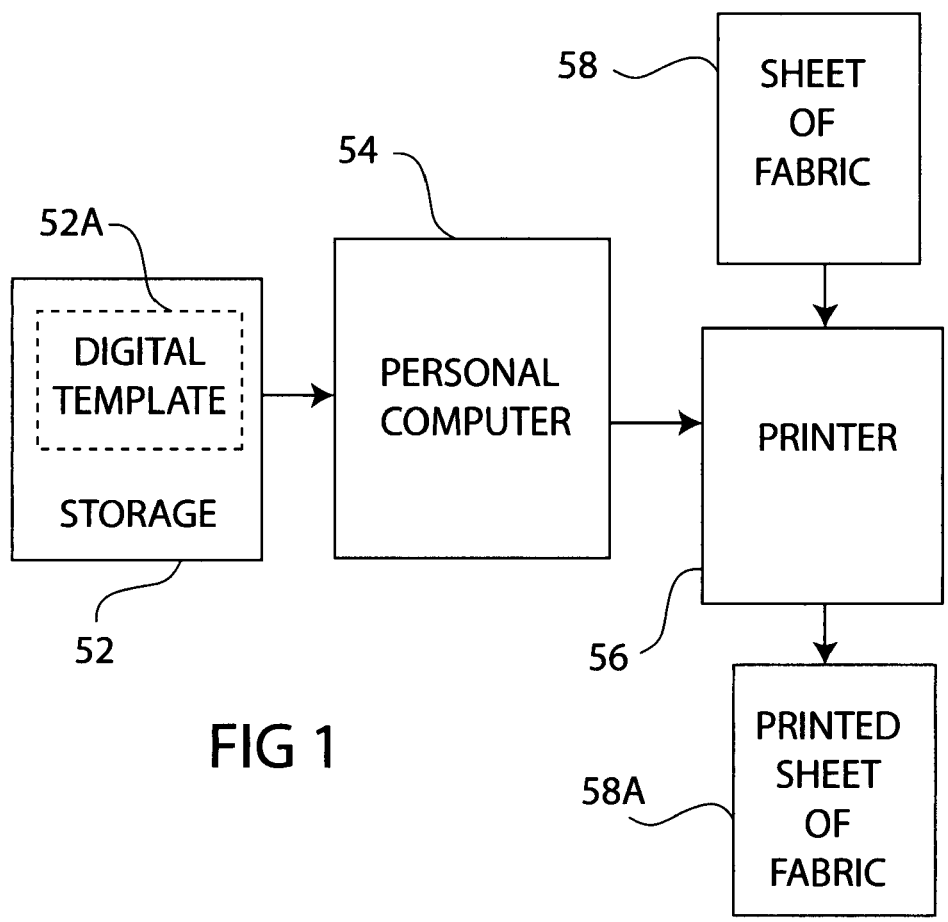

| DRAWINGS-REFERENCE NUMERALS | |
| --- | --- |
| 52 | storage |
| 52A | digital template |
| 54 | personal computer |
| 56 | device for printing |
| 58 | sheet of fabric |
| 58A | printed sheet of fabric |
| 60 | cutting line |
| 62 | stitching line |

-continued

| DRAWINGS-REFERENCE NUMERALS | |
|---|---|
| 64 | crosshair |
| 66 | registration mark |
| 68 | matching mark |
| 70 | individual patch |
| 72 | seam allowance |
| 74 | ruler guide |
| 76 | guideline |
| S801 | Insert CD in personal computer to view digital templates |
| S802 | Best color of ink? |
| S803 | Navigate to template with appropriate ink color |
| S804 | Set page size and number of sheets to print in dialog box |
| S805 | Load fabric into printer and click to print |
| S806 | Cut patches apart with rotary cutter or scissors |
| S807 | Stitch as desired by hand or machine |
| S808 | Finish in traditional manner and wash, if necessary |

DETAILED DESCRIPTION—FIGS. 1 to 7—PREFERRED EMBODIMENT

Referring to the drawings, FIG. 1 shows the configuration of the components of the preferred embodiment, including printed sheet of fabric 58A. My system and method for printing on fabric uses at least one digital template 52A in storage 52, which may be a CD, DVD, hard disk, floppy disk, etc. The digital template 52A is prepared in a vector-drawing program (such as Adobe Illustrator®) so as to be compatible with a printer 56 attached to a personal computer 54.

The preferred embodiment requires a personal computer 54 with conventional peripheral devices (such as a CD drive, monitor, keyboard, mouse or the like) and a conventional printer 56, which is preferably a color inkjet printer 56. These do not require any adaptation for the preferred embodiment to print at least one digital template 52A on sheet of fabric 58. Sheet of fabric 58 may be any size compatible with printer 56, but is typically no smaller than 7.6×12.7 cm (3×5 inches).

FIGS. 2 to 7 show examples of digital templates 52A, which have several innovative features, including the following:

a) Preference for Fugitive Ink—FIG. 2

Digital templates 52A (e.g. FIG. 2) print ultra-fine lines in the most fugitive inks. In this context, fugitive ink is ink that is likely to fade or wash out of fabric. Inkjet printers commonly use a combination of four inks to print all printable color. The four inks are referred to as CMYK, representing cyan, magenta, yellow and black. Occasionally there are only three inks, and a weak black is mixed from CMY. Cyan, magenta and yellow inks tend to be fugitive, and therefore suitable for my system and method.

This preference for fugitive ink is the opposite of prior art printing on fabric. With prior art, fugitive ink is a disadvantage. It is the reason that special fabric treatments have been required when decorations printed on fabric are intended to be permanent.

By using fugitive ink colors, the consumer has the benefit of guides marked on the fabric while cutting and sewing, but the ink does not show in the finished fabric item.

b) Compatible with any Inkjet Cartridge

For the preferred embodiment, the consumer can use any ordinary inkjet ink cartridge. Using common cartridges sold for inkjet printers by many manufacturers, colors mixed from cyan, magenta and yellow inkjet ink have a high probability of washing out of fabric or fading over time with exposure to light. Even if the ink does not wash out, it is printed in such a way that it does not show in the finished fabric item.

The trend of inkjet printer manufacturers has been towards making ink more permanent and stable, so adaptations may be necessary in the future. It is also possible that ink will be available that will always disappear or wash out. That would be a perfect complement to my system and method. It is also possible that ink will be available that will be permanent, without smearing or bleeding on fabric when it is washed. That would also be suitable for my system and method.

Ideally, the ink cartridge is the same one used for printing on paper. A very small amount of ink is used to print ultra-fine lines so a cartridge lasts a long time, which is economical and environmentally desirable.

When each digital template 52A is prepared in vector-drawing software, such as those in FIGS. 4 to 7, the amount of each of the four CMYK inks is specified, so any inkjet printer 56 will deposit this predetermined amount of each ink on each sheet of fabric 58, producing printed sheet of fabric 58A.

Cyan, magenta and yellow inks are used in combination to create many colors with varying opacity. Black is the least desirable for digital templates 52A because it is the most permanent inkjet ink, and usually smears when wet, leaving a stain that can shadow through to the right side. Black (K of CMYK) is usually set at zero, but it may be used in some cases to meet special circumstances.

Since manufacturers frequently change their ink formulas, users should test with each new ink cartridge, to determine which colors are most fugitive.

c) Test Page—FIG. 2

One digital template 52A is a test page as shown in FIG. 2. It is printed in black ink for the purpose of this application only. The actual test page is always printed on fabric in color. Each numbered square represents a different color in various line weights, as described in the following table.

|  |  |  |  |  | LINE WEIGHTS | | |
|---|---|---|---|---|---|---|---|
| NAME | C | M | Y | K | STITCH | MARK | CUT APPEARANCE |
| 00 | 25 | 25 | 0 | 0 | 0.2 pt | 0.25 pt | 0.3 pt GRAY |
| 01 | 35 | 35 | 0 | 0 | 0.2 pt | 0.25 pt | 0.3 pt GRAY |
| 02 | 50 | 50 | 0 | 0 | 0.2 pt | 0.25 pt | 0.3 pt GRAY |
| 04 | 75 | 0 | 0 | 0 | 0.2 pt | 0.25 pt | 0.3 pt CYAN |
| 05 | 0 | 20 | 100 | 0 | 0.5 pt | 0.55 pt | 0.8 pt YELLOW |
| 11 | 75 | 75 | 0 | 0 | 0.2 pt | 0.25 pt | 0.3 pt GRAY |
| 16 | 0 | 75 | 50 | 0 | 0.2 pt | 0.25 pt | 0.3 pt RED |
| 18 | 80 | 10 | 50 | 0 | 0.2 pt | 0.25 pt | 0.3 pt GREEN |
| 20 | 50 | 50 | 0 | 0 | 0.4 pt | 0.45 pt | 0.6 pt GRAY |
| 21 | 75 | 75 | 0 | 0 | 0.4 pt | 0.45 pt | 0.6 pt GRAY |
| 22 | 100 | 100 | 0 | 0 | 0.4 pt | 0.45 pt | 0.6 pt GRAY |

-continued

| NAME | C | M | Y | K | LINE WEIGHTS STITCH | MARK | CUT | APPEARANCE |
|---|---|---|---|---|---|---|---|---|
| 26 | 0 | 80 | 80 | 0 | 0.4 pt | 0.45 pt | 0.6 pt | RED |
| 28 | 80 | 10 | 50 | 0 | 0.4 pt | 0.45 pt | 0.6 pt | GREEN |
| 31 | 75 | 75 | 0 | 0 | 0.5 pt | 0.55 pt | 0.8 pt | GRAY |
| 35 | 0 | 50 | 100 | 0 | 0.5 pt | 0.55 pt | 0.8 pt | ORANGE |
| 36 | 0 | 100 | 100 | 0 | 0.5 pt | 0.55 pt | 0.8 pt | RED |
| 38 | 80 | 30 | 50 | 0 | 0.5 pt | 0.55 pt | 0.8 pt | GREEN |
| 41 | 75 | 75 | 0 | 0 | 0.7 pt | 0.75 pt | 1 pt | GRAY |
| 46 | 0 | 100 | 100 | 0 | 0.7 pt | 0.75 pt | 1 pt | RED |
| 50 | 75 | 75 | 0 | 50 | 0.7 pt | 0.75 pt | 1 pt | DARK GRAY |

The test page is used to determine which color(s) show well on the chosen fabric without showing in the finished item. The ultra-fine lines are printed with weights ranging from 0.2 points (0.07 mm) to 1 point (0.35 mm) in the examples above. At least one color/weight is likely to be suitable.

Since the amount of C, M, Y and K ink to be deposited for each digital template 52A is determined by the vector-drawing software, this embodiment is easy for the consumer to use. The various colors are designed to wash out of the fabric when the fabric item is finished, if possible. Otherwise, the lines are printed in a manner that ensures they will not be visible in the finished item. According to my preferred embodiment, an appropriate color will not show in the finished item if it washes out, and/or it is so light and fine on the wrong side that is does not show on the right side of the finished fabric item, and/or it is printed in an inconspicuous place, such as the wrong side of fabric.

By providing every digital template 52A in many colors, my system and method allows the consumer to use almost any fabric. Very dark fabric is commonly lighter on the wrong side, and if it is not, there may not be a color that will show well enough. This is still an improvement over prior art. With prior art methods there are fewer colors of suitable markers available.

The colors and line weights of my system and method are not limited to those specifically indicated.

The method for determining the best color of ink is described in the operation section below.

d) Distinctive Line Characteristics—FIGS. 3 to 7

FIGS. 3 to 7 show various distinctive lines used on the templates. Guidelines 76 can be many types including cutting lines 60, stitching lines 62, crosshairs 64, registration marks 66, matching marks 68, or other possible numbers and color-coding. Each has unique characteristics so the user can easily identify which is which.

Examples of guidelines 76 illustrate that stitching lines 62 are dashed lines, cutting lines 60 are solid lines, registration marks 66 are short solid lines crossing a cutting line, and matching marks 68 are short solid lines crossing a stitching line.

An individual patch 70 may include several types of guideline 76. The purpose of each type of line in combination with the others is obvious with little or no instruction, making my system and method especially suitable for beginners and children.

Individual patches 70 of various shapes and sizes (e.g. hexagons in FIG. 4) may be all one shape or several different shapes that fit together in the fabric item.

Figure 3:
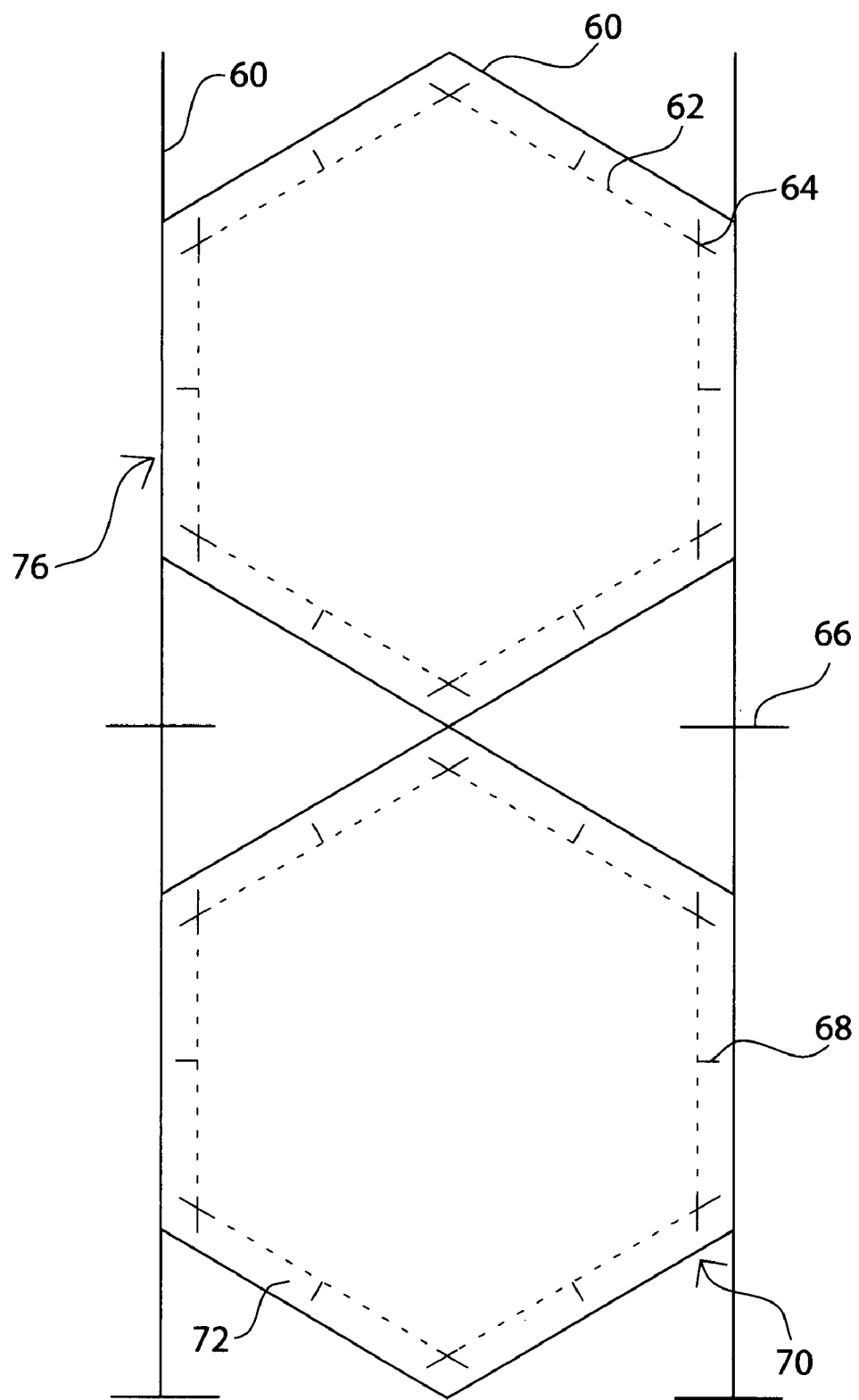

The characteristics of the lines are not limited to those specifically indicated. Additional line features and numbering may be appropriate to enable the user to prepare fabric patches.

e) Precise Line Weight—FIGS. 2, 3

Digital templates 52A offer the user a choice of several line weights and ink colors that will deposit the minimum amount of ink on sheet of fabric 58. Examples are shown in FIG. 2, and described above. Lines are generally 0.2 to 0.75 pt (0.75 pt=0.26 mm), although thicker and thinner lines are appropriate in some cases.

The finest, lightest lines offer greater accuracy than traditional methods and are most likely to fade or wash out. Lines drawn by traditional methods with pencils and other markers are very difficult to draw this precisely and are usually permanent. Lines drawn by traditional methods are more likely to bleed or show through the fabric on the front of the fabric.

FIG. 3 identifies a variety of guidelines 76 used in digital templates 52A f) Pages of Patches—FIGS. 4 to 7

Digital template 52A may represent any size or shape of piece or patch on a digital page. Individual patch 70 may be defined by cutting lines 60 and/or stitching lines 62, with or without crosshairs 64 and other marks.

Examples are shown in FIGS. 4 to 7. A page may contain rows of a single shape; or, it may be a combination of several shapes that fit together, which are to be cut from one of the user's chosen fabrics. Each patch 70 is aligned with the correct straight grain of woven fabric, if sheet of fabric 58 is cut on the straight grain.

Figure 4:
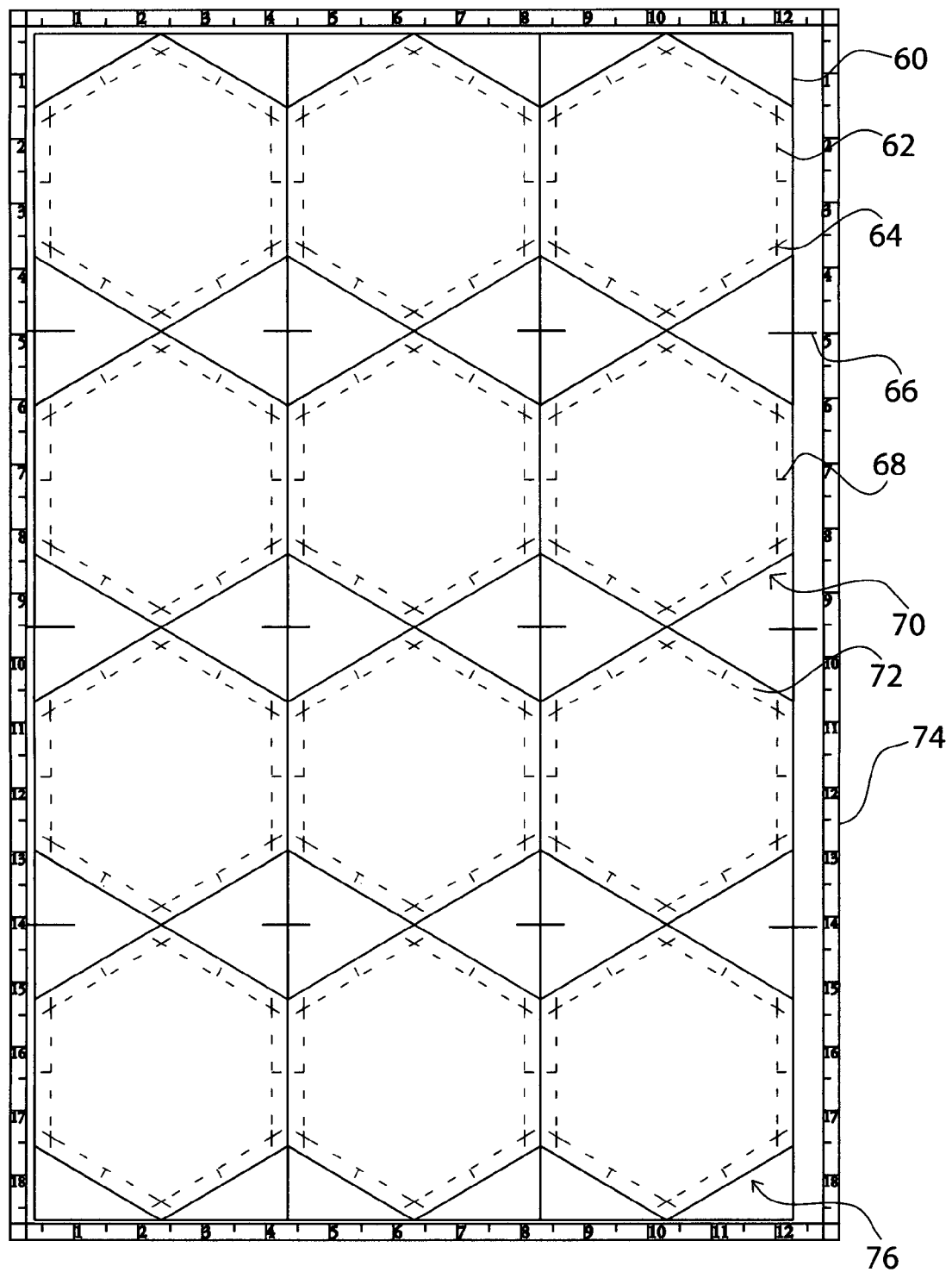
FIG. 4 represents a page of patches printed from a digital template on a sheet of fabric.
Figure 5:
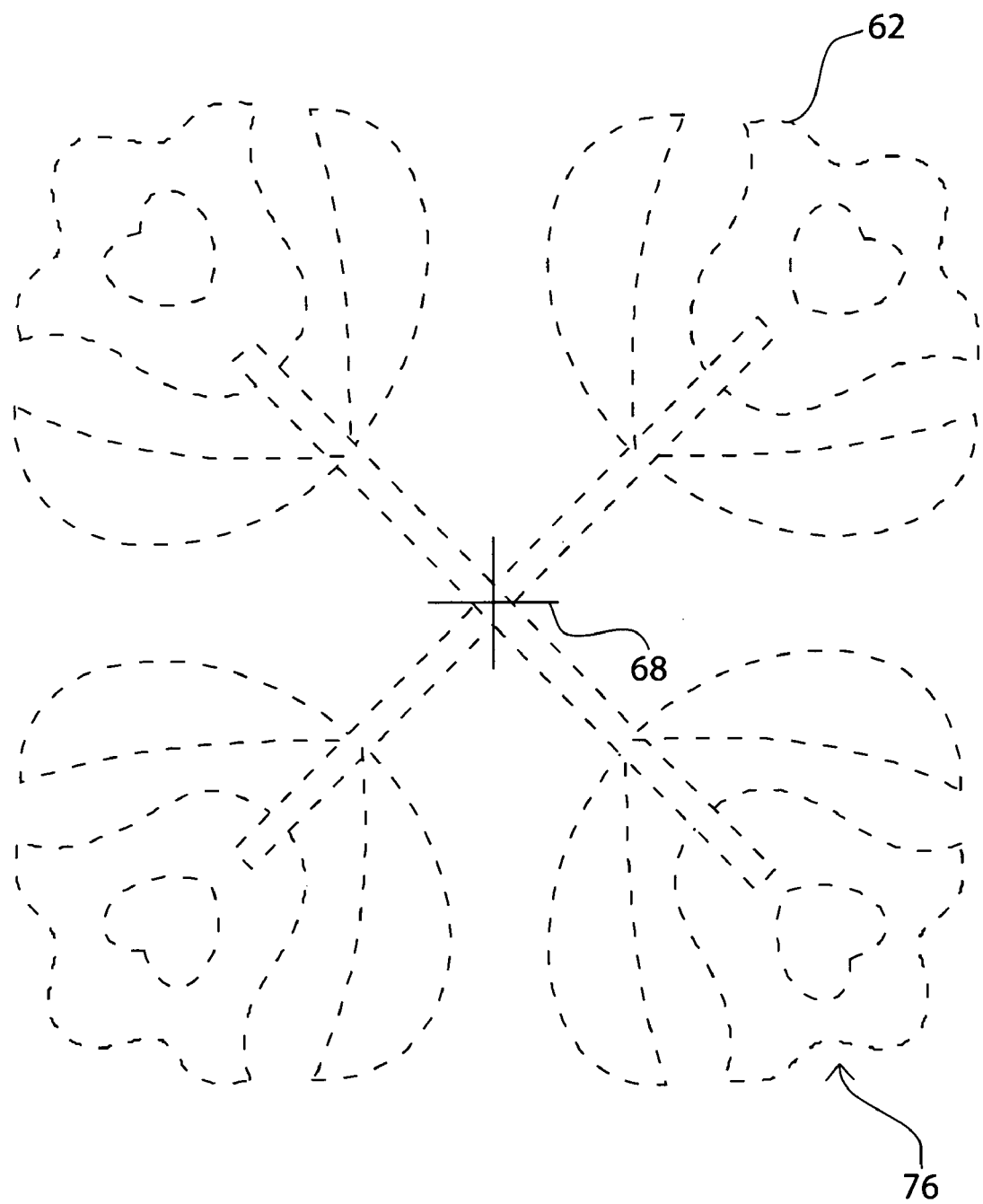
FIG. 5 represents guidelines for the placement of appliqué patches, quilting, embroidery or other stitching, printed from a digital template on a sheet of fabric.
Figure 6:
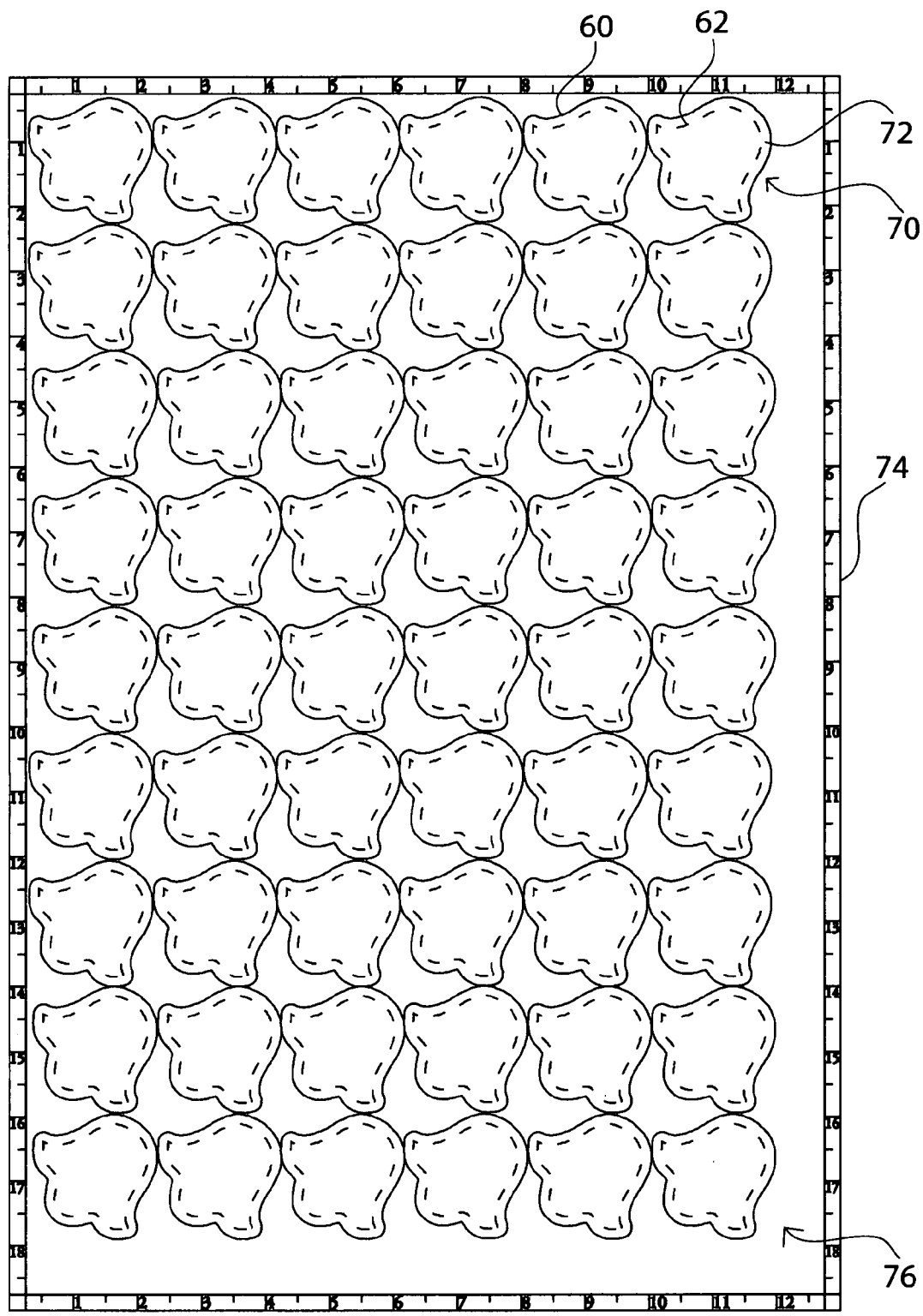
FIG. 6 represents guidelines for cutting and stitching of patches for appliqué, printed from a digital template on a sheet of fabric.
Figure 7:
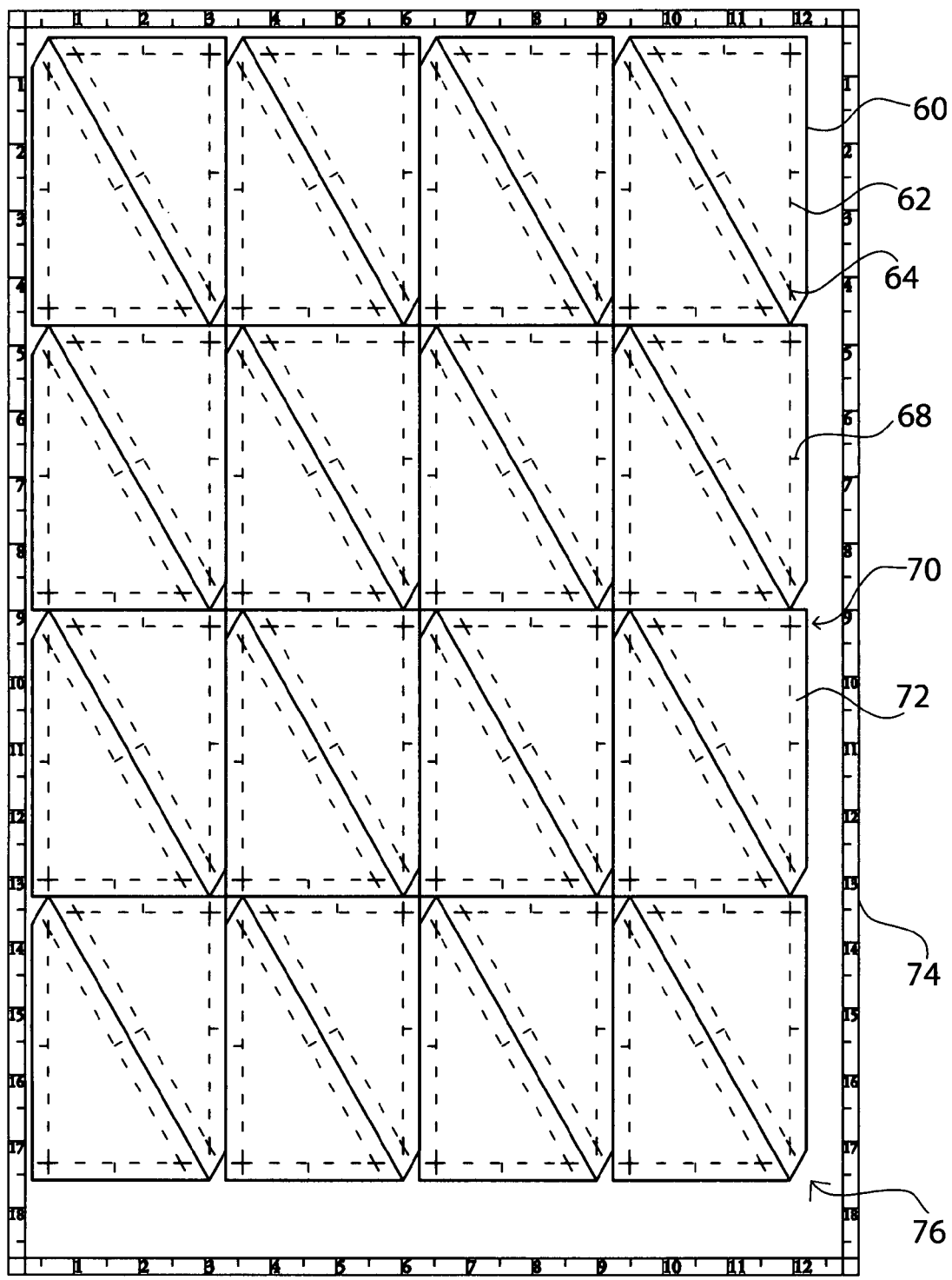
FIG. 7 represents guidelines for patches to stitch by hand, by machine or by foundation piecing methods, printed from a digital template on a sheet of fabric.

Any designs can be represented on digital template 52A including patches to be sewn onto a foundation. FIG. 5 shows lines to be printed on a background fabric to guide appliqué, embroidery, quilting stitches or other sewing. Digital template 52A may represent the entire design to be printed on the background as in FIG. 5, or individual appliqué patches, as in FIG. 6, eliminating the need for tracing, light boxes, and overlays.

g) Page Size—FIGS. 4, 6 and 7

In my preferred embodiment, digital templates 52A are provided in the largest size commonly compatible with inkjet printers 56, which is 33×48.3 cm (13×19 inches). Pieces larger than this require more than one digital template 52A and more than one printed sheet of fabric 58A, to be joined with seams.

Large pages of templates are compatible with smaller printers 56. Software provided with ordinary color inkjet printers 56 allows the user to print custom sizes as small as 7.6×12.7 cm (3×5 inches), and to choose portrait or landscape mode, whichever makes the best use of fabric sheet 58A.

The page size of my system and method is not limited to that specifically noted.

h) Ruler Guides—FIGS. 4, 6 and 7

FIGS. 4, 6 and 7 show at least one ruler guide 74 on the borders of digital templates 52A to allow the user to determine how many patches would print on a given size of fabric sheet 58 by looking at the display of personal computer 54. Using FIG. 4 as an example, he may determine that the portion of a digital template 52A with four individual patches 70 is approximately 21×24.1 cm (8.25×9.5 inches), and he would cut fabric sheet 58 accordingly.

Sheet of fabric 58 may be cut in any size within the limits of printer 56. Thus, my system and method allows a user to print fabric sheet 58 in any size from 7.6×12.7 cm (3×5 inches) up to 33×48.3 cm (13×19 inches) with printers 56 commonly available, using personal computer 54 to interface with printer 56.

i) Manages Straight Grain of the Fabric—FIGS. 4 to 7

Individual patches 70 are arranged on digital templates 52A to be on the appropriate straight grain of the fabric, as shown in FIGS. 4 to 7. If fabric sheet 58 is cut on the straight grain, each individual patch on printed fabric sheet 58A will be on the intended straight grain, saving the consumer the time it takes to align them individually using prior art, and improving accuracy.

j) Compatible with Rotary Cutting or Scissors—FIG. 4

Digital templates 52A are streamlined to facilitate rotary cutting, or cutting with scissors, with minimal waste. For example, in FIG. 4 individual patches 70 are arranged in identical vertical rows, and the rows have registration marks 66 on the edges so they can be precisely aligned and stacked, so identical patches can be cut from several layers at a time. The user just cuts on solid cutting lines 60, so there is no need to measure. The rotary cutter can therefore be used with any straight edge, without the need for a specialty ruler. Eliminating the need to measure reduces errors and saves time.

Some digital templates 52A are designed for scissors rather than a rotary cutter when there is an advantage. For example, for some patches 70, a layout to cut with scissors may minimize the amount of fabric required.

Digital templates 52A designed for rotary cutting can be cut with scissors, if desired. This is good for children, beginners, and handicapped users who do not want to use a rotary cutter for safety reasons. Quilting and sewing are accessible to more people with my system and method than with prior art.

k) Color Coding—FIG. 5

Guidelines 76 on digital templates 52A may be numbered and color-coded to convey information that will be useful during the cutting or stitching processes, when appropriate. This is self-explanatory to many users, and very simple instructions suffice.

For designs like FIG. 5, several different colors of guideline 76 may be used on a single template to distinguish fabrics to be used for various appliqué patches, and/or the color of thread for embroidery, and/or the order in which they should be stitched. This makes complex designs easier.

l) Appropriate Seam Allowances—FIGS. 3, 4, 6 and 7

Seam allowance 72 is the space between cutting line 60 and stitching line 62, as shown in FIGS. 3, 4, 6 and 7. Precise and consistent seam allowances 72, of any desirable width can be provided. FIG. 7 shows an example where cutting lines 60 are angled to eliminate unnecessary points in the seam allowance ("dog ears"), which makes pinning and stitching easier and more accurate.

The width of seam allowances 72 may be different on each side of patch 70. Also, digital template 52A may be provided with 4.76 mm (3/16 inch) seam allowances when there is an advantage, although that would be frustrating to measure with prior art. Some desirable widths have not been commonly used because of the difficulty in measuring with prior art methods.

Seam allowances 72 are not limited to those indicated.

m) Mirror Image

Digital templates 52A are designed to compensate for mirror image so that lines printed on the wrong side of the fabric will give the correct orientation on the right side of the fabric in nonsymmetrical designs. In current practice this is confuses many users and causes errors which waste time, effort and fabric.

n) Removable Storage

As shown in FIG. 1, digital templates 52A are provided in the desired file format (PDF) on storage 52 which is a CD-ROM, which is protected against copying onto a hard drive. Thousands of digital templates 52A can be stored on one CD.

Digital templates 52A are ready to print as soon as the CD is opened. All of the features of digital templates 52A, like those in FIGS. 2 to 7, are established so the user does not need to learn editing or drawing tools to print guidelines on fabric. The user can print an unlimited number of patches 70 on fabric using a very small amount of ink.

Operation—FIGS. 1 to 8—Preferred Embodiment

Figure 8:
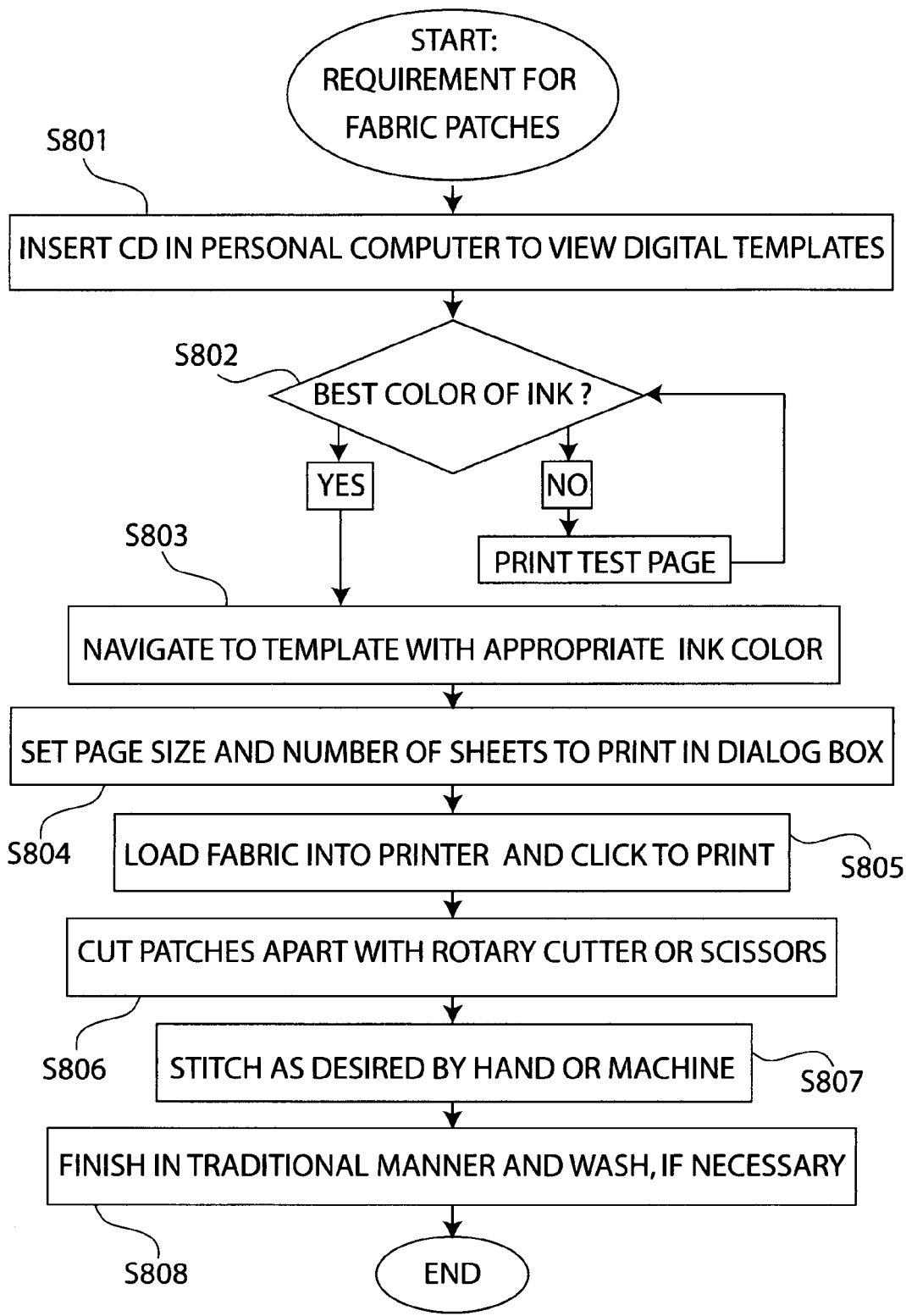
FIG. 8 is a flowchart of the steps performed by the user in the preferred embodiment.

The system and method is described using FIG. 8, a flowchart, which lists the steps performed by the user for printing on fabric in the preferred embodiment.

First, the user identifies a requirement for fabric patches. The user selects one or more fabrics, including woven and non-woven cloth composed of various natural and synthetic fibers and dyes, having two surfaces, sometimes called a right (decorative) and wrong side. She chooses a pattern or plan for making a fabric item, such as a quilt or other article composed of fabric from all existing designs according to current practice.

In S801, the user inserts a CD-ROM in the personal computer 54 (FIG. 1). The CD is storage 52, which contains at least one digital template 52A that has been prepared according to my system and method. The CD automatically opens a PDF file with Adobe Acrobat Reader (included on the CD) and displays one or more digital templates 52A on the display of personal computer 54.

Digital templates 52A are composed of lines and other marks, such as those shown in FIGS. 2 to 7. FIGS. 4 to 7 are provided in several digital templates 52A that are identical except for the color and weight of the lines.

In some cases, it will be obvious to the user which color will show well on a particular fabric and not show in the finished fabric item. If the best color of ink is not known, in S802 the user prints a test page (e.g. FIG. 2), with printer 56 on the chosen fabric, and examines it to see which of the choices provides a good visual guide for cutting and stitching without being visible in the finished fabric item. To complete this test she must wash or rinse the fabric to ensure that the chosen ink will not smear or bleed when wet. With most inkjet ink cartridges, all of the ink will wash out, and the fabric used for the test can be washed and re-printed for use in the fabric item.

In S803, the user navigates on the display of personal computer 54 to digital template 52A with the chosen color of ink by entering the page number.

In S804, the user sets the desired page size and the number of fabric sheets 58 to print, using the print dialog box for printer 56, which is a color inkjet printer or similar mechanism connected to personal computer 54. Each sheet of fabric 58 is stabilized with freezer paper according to current practice for printing on fabric. In S805, the user loads fabric sheet 58 into printer 56 to print on either the right or wrong side of the fabric. The user may repeat S805 several times to obtain the number of printed sheets of fabric 58A required.

In S806, the user removes the stabilizer from printed fabric sheets 58A and cuts along cutting lines 60 with scissors or a rotary cutter.

When appropriate, the user can cut rows, stack identical rows using registration marks 66, and cut several layers at a time along cutting lines 60. There is no measuring, so the blade of the cutter can be placed on cutting line 60 first, before the straight edge is aligned, making it less likely that the cutter will jump the edge of the ruler and hurt the user, or chip the edge of the ruler.

If the user only requires cutting lines 60 (without stitching lines 62) on patches for machine stitching, she may layer printed fabric sheet 58A, such as FIG. 7, on top of several sheets of un-printed fabric and cut all of the layers at once, using printed fabric sheet 58A as a cutting guide. Some of the patches will not have stitching guides, but that is common practice for machine stitching. Printing just one fabric to cut several fabrics saves ink and saves time. It also allows the consumer to accurately cut very dark fabrics for which none of the ink colors shows adequately, by printing only lighter fabrics.

In S807, the user finishes the fabric patches by hand stitching or machine stitching, according to current practice, using stitching lines 62, matching marks 68 and crosshairs 64, printed from digital template 52A, as a guide. Patches prepared without stitching lines 62 can be stitched by machine using prior art. Some patches 70 may be fused with various fabric adhesives during assembly, to create the effect of sewing, and that meaning is included in the references to sewing in this application. Either way, the various lines and marks simplify the finishing process.

In S808, the user finishes the fabric item in the traditional manner, and washes the finished fabric item according to current practice, if necessary, to remove traces of ink that would otherwise be visible.

Description—Additional Embodiment

In an alternative embodiment, digital templates 52A are provided with software that permits the user to modify patches 70 or guidelines 76 to suit individual needs.

Modifications may include changing the size of the patches 70, changing the width of the seam allowances 72, changing the arrangement of the patches 70, changing the color of the guidelines 76, changing the weight of the guidelines 76, and designing new patches 70 and guidelines 76.

This embodiment requires either adding functionality to existing quilt design software, or removing functionality from existing vector-drawing software to simplify the commands to suit the needs and capabilities of quilters and sewers.

This embodiment is ideal for computer users with some experience who desire to customize digital templates 52A for unique quilts and fabric items.

The editing/modifying functions of my system and method are not limited to those specifically indicated.

Operation—FIG. 8—Additional Embodiment

In S801 the user inserts a CD-ROM in the personal computer. This is similar to the method detailed in FIG. 8, except that instead of opening a PDF file, the CD opens vector-drawing software (included on the CD or on personal computer 54).

The user can view digital templates 52A, and also use the tools of the vector drawing software to modify digital templates 52A in several ways, including:
  Selecting and scaling one or more patches to make them larger or smaller;
  Selecting and scaling one or more seam allowances to make them wider or narrower;
  Selecting and moving one or more patches in relation to other patches;
  Selecting and re-coloring one or more lines;
  Selecting and changing the weight of one or more lines;
  Selecting and distorting one or more patches to change the shape;
  Selecting and removing one or more lines; and
  Saving any of the changes as a new digital template 52A.

Otherwise S802 to S808 are substantially the same as for the preferred embodiment.

CONCLUSION, RAMIFICATIONS, AND SCOPE

The system and method for printing on fabric with digital templates of the present invention overcomes the deficiencies of prior art and makes sewing and quilting more accessible to beginners and children.

The system and method is faster, more accurate and simpler than prior art. It is also potentially more economical or more profitable. It makes the preparation of fabric more enjoyable and enhances the quality of the finished fabric items.

My system and method is more flexible, more convenient and potentially safer than prior art. The many advantages of my system and method also make it marketable.

Additional embodiments of this system and method, other than that described in the preferred embodiment, include different methods of creating, providing or distributing the digital templates, and may include using the World Wide Web, scanners, copiers, digital cameras and other peripheral equipment functioning with the personal computer. For example, a user may access digital templates 52A via the World Wide Web, or may scan an object via a scanner, or copy an object via a photocopier, and transfer a digital image of the object to the computer to provide a digital template.

Additional embodiments of this system and method, other than that described in the preferred embodiment, may also include new fabric items which were not possible with prior art methods.

New printing technology and new ways of providing printable sheets of fabric may make it possible to print with heavier lines, or in more colors that show on dark fabrics, or in even larger sizes.

Vector-drawing software may be customized to be compatible with my system and method, to allow a user to modify existing digital templates, or to design her own.

Why has this System and Method not been used in the Past?

It is only natural to wonder why a system and method with so many advantages has not been used before. There are several possible reasons that home sewing, quilting and printing all moved in a different direction.

Some factors that may have delayed introduction of my system and method are:

(a) For many years, consumers have done without guidelines on fabric in order to benefit from the speed of rotary cutting. Since most machine piecing is done without stitching lines, it has been acceptable to compensate for the lack of cutting lines by using specialty rulers. However, the popularity of foundation piecing, despite its disadvantages, reminds us that users prefer to have guides on the fabric itself.

(b) In home sewing, fabric pieces are often larger than those used in quilting and embroidery, so the narrow format of early printers limited the possible usefulness of printing on fabric.

(c) Similarly, the fugitive qualities of ordinary inkjet ink were a disadvantage for printing vibrant, durable decorations, so the focus was on developing products that made ink permanent. Attention was drawn away from the advantages of ink that washes out.

It seems as if the speed of the rotary cutter, and a desire to print bold, lasting, custom decorations on fabric have dominated the home sewing and quilting industries. Although many consumers are using printers in their daily lives, not many have an understanding of the properties of CMYK ink coupled with a desire for precise, ultra-fine stitching lines to stitch by hand. This system and method was unlikely to be invented by a machine sewer accustomed to stitching without guidelines, but as has been demonstrated, the advantages of my system and method extend beyond hand piecing to improve machine piecing, appliqué, embroidery and other needlework techniques.

Although the description above contains much specificity, this should not be construed as limiting the scope of the invention but as merely providing illustrations of some of the presently preferred embodiments of this invention. Many other variations are possible, including changes in the ink formulas, changes in the size and design of the digital templates, changes in the storage method, changes in the delivery software, changes in the printer mechanism, and changes in the type of fabric item to be stitched.

Thus, the scope of the invention should be determined by the appended claims and their legal equivalents, rather than by the examples given.

I claim:

1. A method of preparing fabric pieces of a required shape and size for stitching, or for cutting and stitching, a fabric item, comprising:

providing an ink printer attached to a personal computer and a media storage to be used by the personal computer;

providing digital templates in the media storage, wherein said providing digital templates includes the steps of:

a. establishing combinations of ink color composition and line weight that are most likely to wash out of fabric being printed with said combinations of ink color composition and line weight;

b. selecting and tabulating the possible combinations of ink color composition and line weight that are most suitable for printing on a chosen fabric;

c. using a vector-drawing software to prepare guidelines of varying shapes of tabulated combinations of color composition and line weight for each of said digital templates to be printed on a chosen fabric, wherein each of said guidelines of varying shapes of the combinations of color composition and line weight, when printed on the chosen fabric piece, is visible on the fabric piece but will not show on the fabric item in a manner which would diminish the quality of said fabric item;

d. using a vector-drawing software to prepare a plurality of guidelines to create a test page in one of said digital templates and each of said plurality of guidelines represents a combination of color composition and line weight corresponding to one of the guidelines in the other digital templates;

providing the ink printer with a fabric piece;

determining which of the digital templates containing the guidelines with its associated color composition and line weight is best suited for said fabric piece;

printing the guidelines on either side of said fabric piece as desired with the digital template thus determined;

wherein during the determining step, if none of the digital templates in the media storage is obviously suitable for said fabric piece, printing the plurality of guidelines on either side of said fabric piece with the digital template containing the test page, determining which of the plurality of guidelines with the particular ink composition and line weight thus printed is best suited for said fabric piece, and printing the guidelines with the associated digital template thus determined on either side of a fabric piece of the same type as the fabric piece being printed with the test page;

whereby a user can see at least one of said guidelines on said fabric piece to assist in stitching, or cutting and stitching, said fabric pieces, but said guideline will not show in a manner which would diminish the quality of said fabric item.

2. The method of claim 1, wherein said fabric item is a quilt.

3. The method of claim 1, wherein said fabric item is needlework.

4. The method of claim 1, wherein said ink printer is an Inkjet printer.

5. The method of claim 1, further comprising a step of modifying said guidelines in said digital templates using the vector-drawing software.

6. The method of claim 1, wherein said ink composition is designed to be temporary or invisible in said fabric item.

* * * * *